(12) United States Patent
Solar et al.

(10) Patent No.: US 11,839,955 B2
(45) Date of Patent: *Dec. 12, 2023

(54) BIASED PAWL RATCHETING WRENCH

(71) Applicant: Great Star Tools USA, Inc., Huntersville, NC (US)

(72) Inventors: Brenton Michael Solar, Genoa, IL (US); Mark Robert Stanley, Shabbona, IL (US)

(73) Assignee: Great Star Tools USA, Inc., Huntersville, NC (US)

( * ) Notice: Subject to any disclaimer, the term of this patent is extended or adjusted under 35 U.S.C. 154(b) by 605 days.

This patent is subject to a terminal disclaimer.

(21) Appl. No.: 16/941,160

(22) Filed: Jul. 28, 2020

(65) Prior Publication Data

US 2020/0353603 A1 Nov. 12, 2020

Related U.S. Application Data

(63) Continuation of application No. 14/508,721, filed on Oct. 7, 2014, now Pat. No. 10,730,168.

(60) Provisional application No. 61/936,134, filed on Feb. 5, 2014, provisional application No. 61/890,621, filed on Oct. 14, 2013.

(51) Int. Cl.
*B25B 13/46* (2006.01)
*B25B 13/04* (2006.01)
*F16F 1/26* (2006.01)

(52) U.S. Cl.
CPC .......... *B25B 13/465* (2013.01); *B25B 13/04* (2013.01); *F16F 1/26* (2013.01)

(58) Field of Classification Search
CPC ..... B25B 13/46; B25B 13/461; B25B 13/466; B25B 13/467; B25B 13/468; B25B 21/004; B25B 13/04; B25G 3/18

USPC ..... 81/60, 61, 62, 63, 63.1, 63.2, 124.3, 125
See application file for complete search history.

(56) References Cited

U.S. PATENT DOCUMENTS

| 127,902 A | 6/1872 | Leonard |
| 2,963,929 A | 12/1960 | Barnes |
| 3,466,523 A | 9/1969 | Brook |

(Continued)

FOREIGN PATENT DOCUMENTS

| DE | 29702864 U1 | 4/1997 |
| EP | 0876558 A1 | 11/1998 |

(Continued)

OTHER PUBLICATIONS

International Search Report and Written Opinion for PCT/US2014/059613, dated Jan. 7, 2015, 6 pages.

(Continued)

*Primary Examiner* — Brian D Keller
*Assistant Examiner* — Alberto Saenz
(74) *Attorney, Agent, or Firm* — ASHLEY LAW FIRM P.C.; Stephen S. Ashley, Jr.

(57) ABSTRACT

A ratchet wrench comprises a handle defining a cavity including a plurality of teeth on an inner periphery thereof, a wheel, a biasing spring ring, and at least one tooth pawl mounted in recesses formed on the outer periphery of the wheel. The wheel is rotatably mounted inside the cavity and the pawls are biased by the spring ring to engage the plurality of teeth on the inner periphery of the cavity when rotated in a first direction, and to slide over the teeth engage the plurality of teeth on the inner periphery of the cavity when rotated in a direction opposite the first direction.

16 Claims, 11 Drawing Sheets

(56) References Cited

U.S. PATENT DOCUMENTS

| | | |
|---|---|---|
| 3,906,822 A | 9/1975 | Hertelendy et al. |
| 4,466,523 A | 8/1984 | De Carolis et al. |
| 4,644,830 A | 2/1987 | Bailey et al. |
| 5,282,830 A | 2/1994 | Reynolds |
| 5,690,202 A | 11/1997 | Myers |
| 5,878,635 A | 3/1999 | Hsieh |
| 5,937,981 A | 8/1999 | Adams |
| 6,044,731 A | 4/2000 | Hsieh |
| 6,050,512 A | 4/2000 | Jung |
| 6,206,160 B1 | 3/2001 | Chen |
| 6,357,323 B2 | 3/2002 | Chi et al. |
| 6,530,296 B1 | 3/2003 | Liao |
| 6,615,693 B1 | 9/2003 | Liao |
| 6,769,330 B2 | 8/2004 | Chang |
| 6,862,955 B1 | 3/2005 | Shi-Sul |
| 8,726,766 B1 | 5/2014 | Wu |
| 9,140,317 B2 | 9/2015 | Buchanan |
| 9,597,782 B2 | 3/2017 | Abel |
| 2001/0003933 A1 | 6/2001 | Chi |
| 2004/0107802 A1 | 6/2004 | Wu |
| 2013/0032008 A1 | 2/2013 | Lee et al. |
| 2013/0340574 A1 | 12/2013 | Buchanan |
| 2015/0059534 A1 | 3/2015 | Wang |
| 2015/0135908 A1 | 5/2015 | Solar et al. |

FOREIGN PATENT DOCUMENTS

| | | |
|---|---|---|
| WO | 2012028869 A1 | 3/2012 |
| WO | 2012028870 A1 | 3/2012 |

OTHER PUBLICATIONS

SIPO Office Action issued on Chinese patent application No. 201480056632.8 dated Apr. 1, 2017, 8 pages.

European Patent Office Supplementary European Search Report issued on European patent application No. 14854690.6, dated May 2, 2017, 9 pages.

Australian Patent Office Examination Report issued on Australian patent application No. 2014334804, dated Jul. 7, 2017, 5 pages.

SIPO Office Action issued on Chinese patent application No. 201480056632.8, dated May 28, 2018, 11 pages.

European Patent Office examination report issued on European patent application No. 14854690.6, dated Aug. 2, 2018, 5 pages.

Mexican Institute of Industrial Property, Office Action issued on Mexican patent application No. MX/a/2016/004758, dated Jul. 24, 2019, 6 pages.

Mexican Institute of Industrial Property, Office Action issued on Mexican patent application No. MX/a/2016/004758, dated Feb. 5, 2020, 2 pages.

IMPI, office action issued on Mexican patent application No. MX/a/2016/004758, dated Jul. 17, 2020, 6 pages.

CIPO, office action issued on Canadian patent application No. 2,927,055, dated Nov. 25, 2020, 3 pages.

BIASED PAWL RATCHETING WRENCH

CROSS REFERENCE TO RELATED APPLICATION

This application is a continuation of U.S. patent application Ser. No. 14/508,721, now U.S. Pat. No. 10,730,168, filed Oct. 7, 2014, which is a non-provisional application claiming priority to U.S. Provisional Application Ser. No. 61/936,134, filed Feb. 5, 2014, and claiming priority to U.S. Provisional Patent Application No. 61/890,621, filed Oct. 14, 2013, all entitled "Biased Pawl Ratcheting Wrench" and the contents of which are each incorporated herein by reference in their entirety.

FIELD OF THE DISCLOSURE

The present disclosure relates generally to ratchet wrenches and more particularly to a biased pawl ratcheting wrench.

BACKGROUND OF RELATED ART

Ratchet wrenches are generally known in the art. For example, U.S. Pat. No. 6,530,296 describes a unidirectional ratchet wrench consisting of a wrench body, a ratchet, an expanding ring and a plurality of clamping blocks, i.e. pawls. The ratchet is rotatably mounted inside the wrench body and has the pawls evenly spaced around the ratchet to engage the inner surface of the wrench body. Two covers are mounted on opposite openings of a toothed cavity of the wrench body to enclose the ratchet.

Similarly, U.S. Pat. No. 6,615,693 describes a ratchet including a head and a driving member rotatably received in the head. A plurality of teeth are defined on the inside surface of the head and a plurality of notches are defined on the outer periphery of the driving member. Each notch has a pawl received therein which engages the teeth of the inside surface of the head. A spring ring is mounted to protrusions formed on each of the pawls and pulls the pawl inward toward the driving member.

Still further, U.S. Pat. No. 6,769,330 describes a ratchet wrench including a driving head having an inner peripheral gear, a wheel rotatably engaged in the driving head and having two openings formed in the outer peripheral portion. Two pawls are received in the openings of the wheel and each has a number of outer teeth for engaging with the inner peripheral gear of the driving head, and each has one end for being biased to engage into the end portions of the openings of the wheel by two springs engaging the pawls.

While each of the above-referenced wrenches generally works for their intended purposes, each of the described wrenches relies upon a wire spring that may be difficult manufacture, to assemble, e.g., may require specialized tools, and/or may be prone to failure based upon the size and fragility of the spring itself.

As such, there is a recognized need in the art for an improved ratchet wrench assembly.

DETAILED DESCRIPTION

The following description of example methods and example apparatus is not intended to limit the scope of the description to the precise form or forms detailed herein. Instead the following description is intended to be illustrative so that others may follow its teachings.

Figure 1:
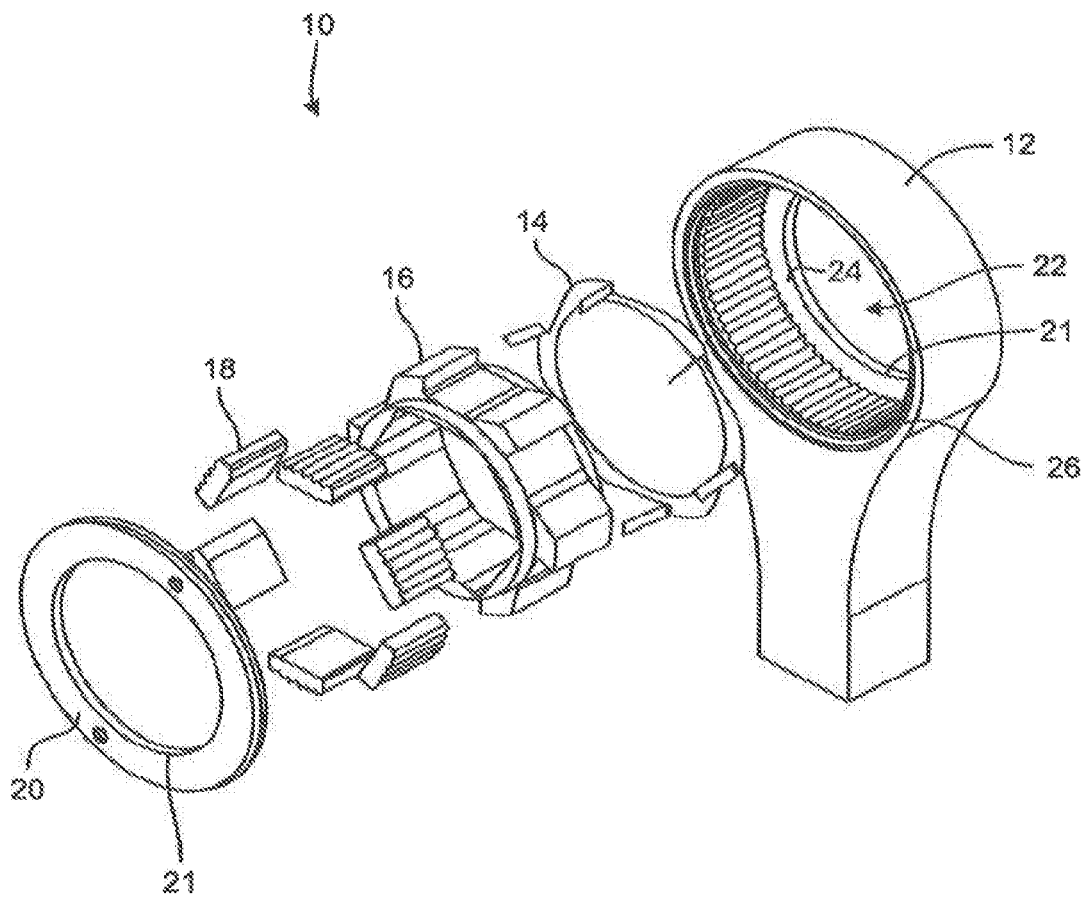
FIG. 1 is an exploded perspective view of an example ratchet wrench in accordance with the present disclosure.
Figure 2:
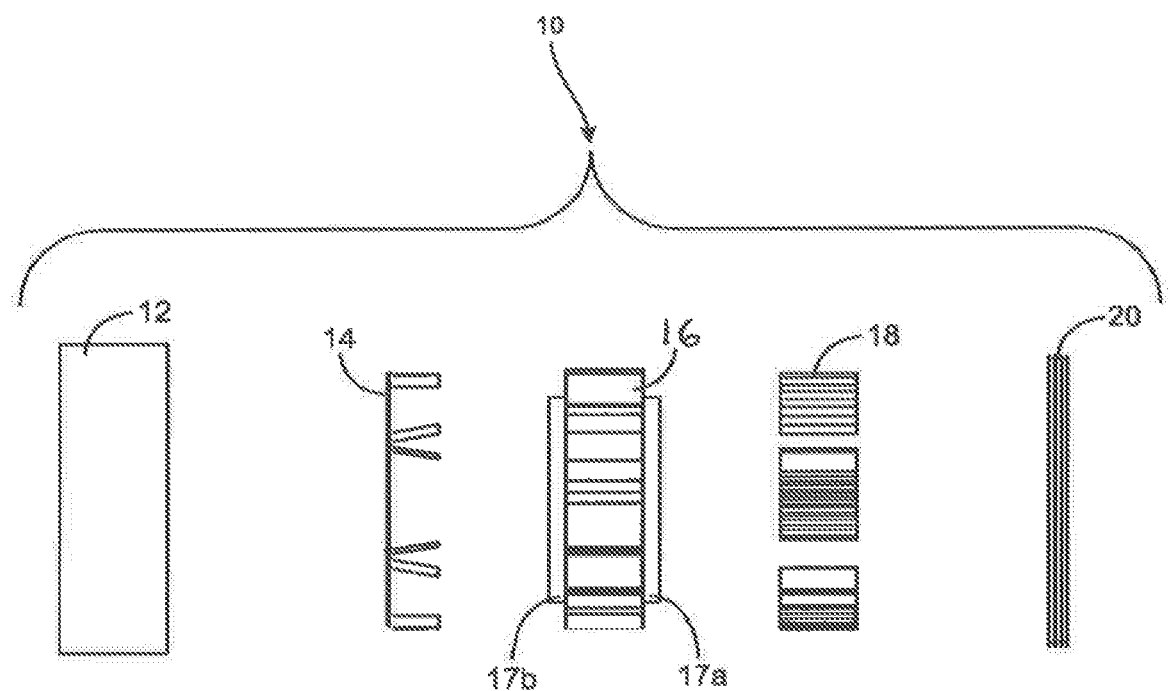
FIG. 2 is an exploded side elevational view of the example ratchet of FIG. 1.
Figure 3:
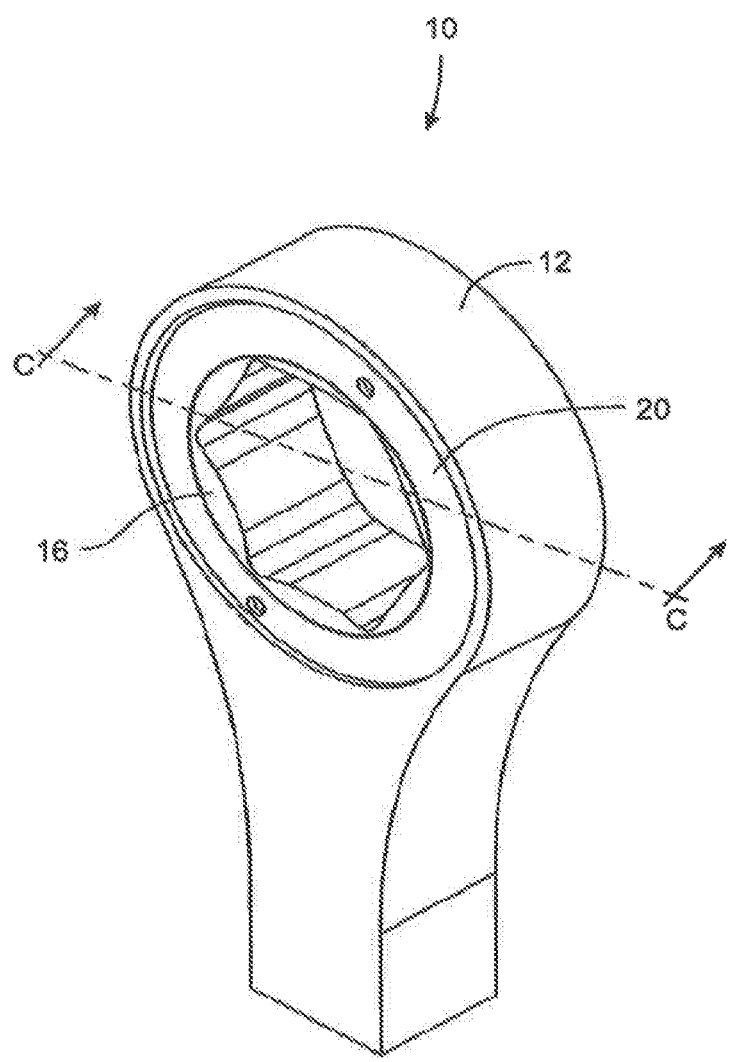
FIG. 3 is a perspective view of the assembled example ratchet wrench of FIG. 1.

Referring now to FIGS. 1 and 2, an example of a ratchet wrench 10 formed in accordance with the teachings of the present disclosure is illustrated. In this example, the ratchet wrench 10 comprises a handle 12, a spring ring 14, a wheel 16, a plurality of pawls 18, and a cap 20.

As illustrated, one end of the handle 12 defines a cavity 22 to rotatably hold the spring ring 14, the wheel 16, and the pawls 18 as illustrated in FIG. 1. In this example, one side of the cavity 22 is integrally formed with a wall or flange 24 to at least partially enclose the one side of the cavity 22. Meanwhile, the other side of the cavity 22 is adapted to removably receive the cap 20, which is configured to be mounted over the cavity 22 and to at least partially enclose the other side of the cavity 22. In this example, the cap 20 is threaded to engage corresponding threads formed in the inner wall of the cavity 22. It will be appreciated by one of ordinary skill in the art that each of the flange 24 and the cap 20 may be integrally or separately formed as desired, and may be mounted to the handle 12 via any suitable mechanism, including for instance, fasteners, adhesives, solders, etc. Together, the flange 24 and the cap 20, once mounted to the handle 12, cooperate to retain the spring ring 14, the wheel 16, and the pawls 18 within the cavity 22. In addition, the flange 24 and the cap 20 each define an aperture 21 to allow operable access to the elements retained within the cavity 22.

A plurality of teeth 26 are formed longitudinally on an inner periphery of the cavity 22. In this example, each tooth 26 has a substantially equilateral tooth profile. As will be appreciated, however, in some example, each tooth 26 may include an inclined face and a substantially upright face.

Figure 7:
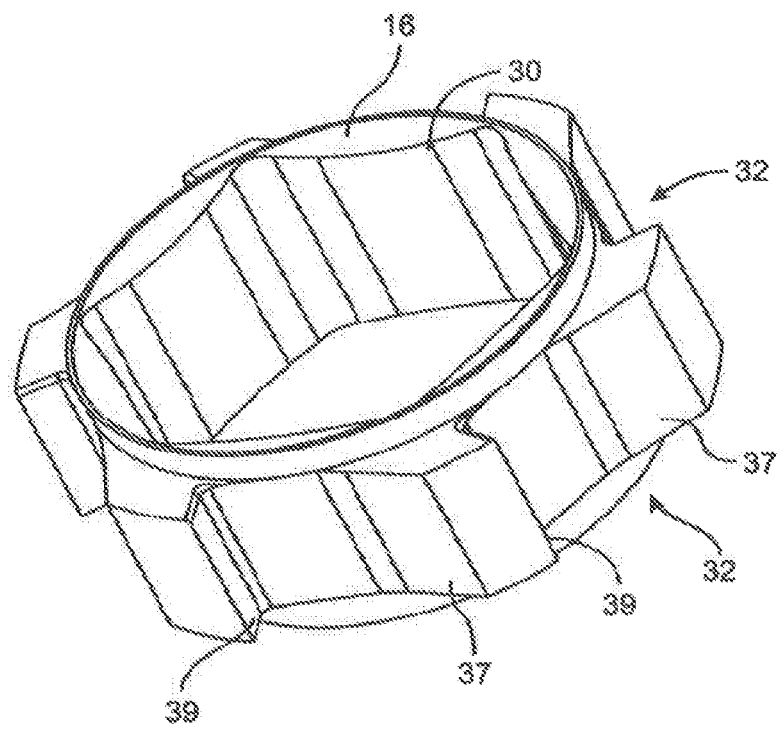
FIG. 7 is a perspective view of an example wheel for use in the example ratchet of FIG. 1.
Figure 8:
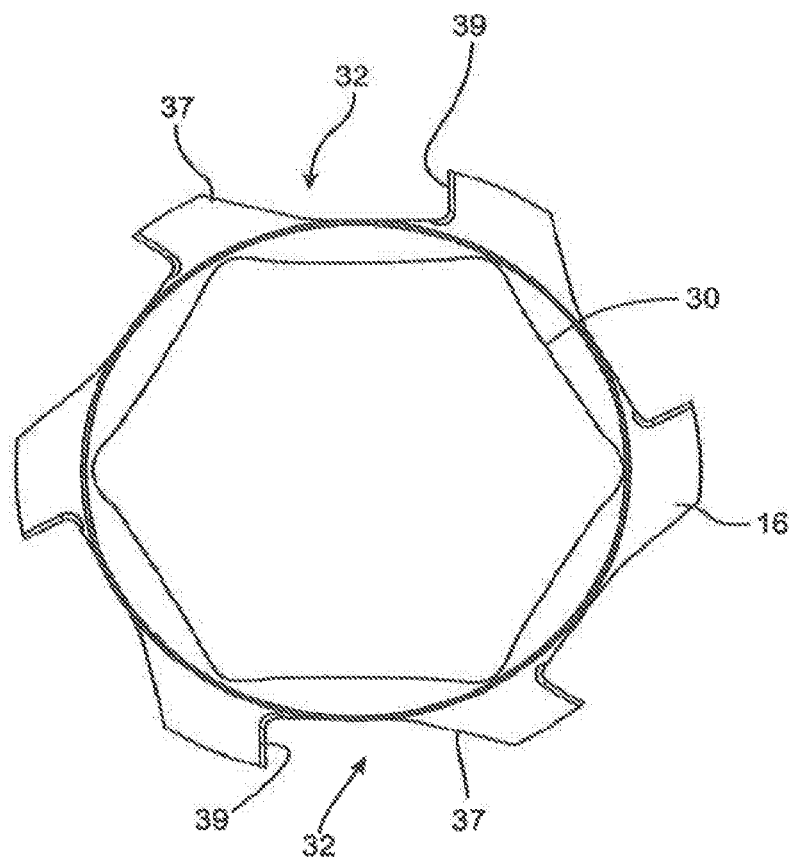
FIG. 8 is a top plan view of the example wheel of FIG. 7.

As additionally illustrated in FIGS. 7-8, in this example, the wheel 16 includes a socket 30 defined in the center and adapted to engage a bolt, nut, fastener, or other similar fitting. In this instance, the example socket 30 is defined as a regular polygon, e.g., a hexagon, but it will be understood that the socket 30 may be any suitable shape and/or design. The example wheel 16 also defines a arcuate flanges 17*a*, 17*b*, extending from each side of the wheel 16 and, in this example, sized to extend at least partially through the corresponding aperture defined by the flange 24 and the cap 20.

At least one pawl recess 32 is longitudinally defined around the outer periphery of the wheel 16. As will be understood, in the illustrated example, the wheel 16 includes six evenly dispersed pawl recesses 32 around the outer periphery, but any suitable number of pawl recesses 32 may be utilized as desired. In addition, the spacing of the pawl recesses need not be evenly or symmetrically arranged around the outer periphery, but may be distributed as preferred.

The example pawl recesses 32 are each bordered by an inclined face 37 on one side and a generally upright face 39 that extends outward from the outer periphery of the wheel 16 on the other side. Similar to the teeth 26, in his example, all inclined faces 37 and the upright faces 39 of the teeth pawl recesses 32 are arranged in the same direction.

At least one pawl 18 is mounted within at least one corresponding pawl recess 32 in the wheel 16. As illustrated, in this example, each of the six pawl recesses 32 includes a corresponding pawl 18, and thus the ratchet 10 includes six pawls 18 distributed around the wheel 16.

In the example illustrated herein, the six pawls 18 are divided into three sets of two pawls, and each of the three sets is clocked differently by the wheel 16 such that when one set of pawls 18 is engaged with the teeth 26, one of the other sets of pawls 18 is only partially engaged (e.g., half engaged) and the remaining set of pawls is disengaged. By clocking the pawls differently a coarser tooth pattern can be used while maintaining a fine tooth pattern action. It will be appreciated that the arrangement and number of sets, and the various clocking patterns associated with the pawls may vary with differing design arrangements.

Figure 9:
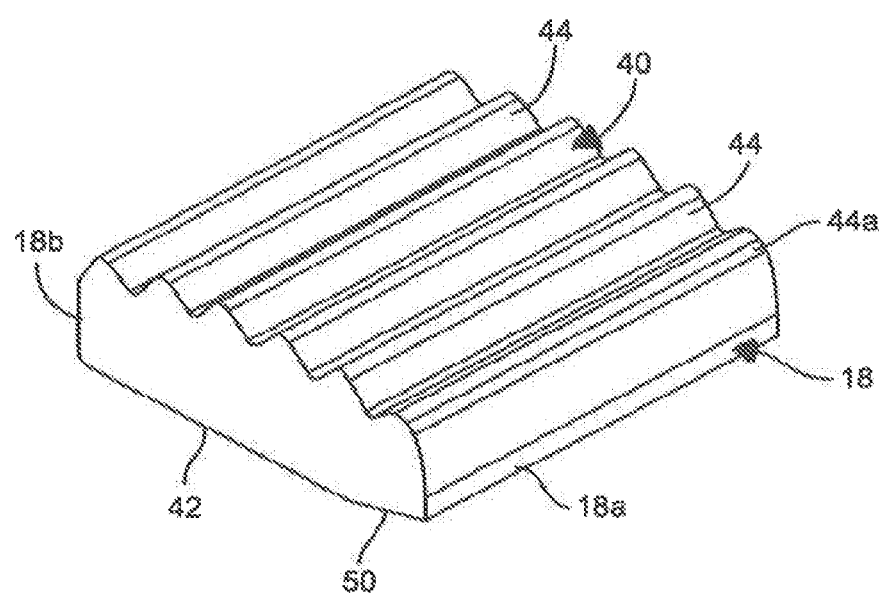
FIG. 9 is perspective view of an example pawl for use in the example ratchet of FIG. 1.
Figure 10:
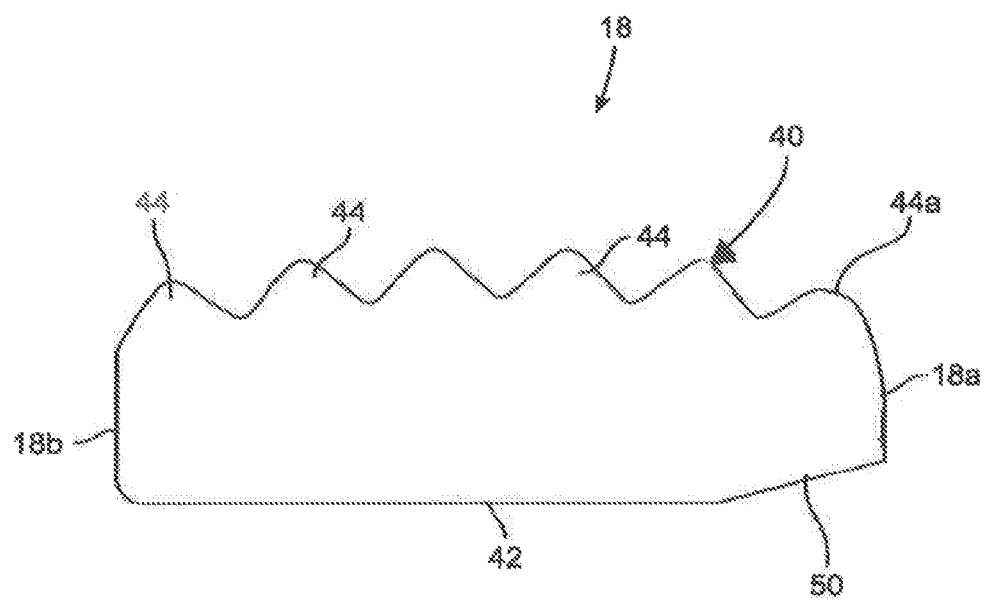
FIG. 10 is a side elevational view of the example pawl of FIG. 9.

As best seen in FIGS. 9 and 10, each of the example pawls 18 includes a toothed face 40 facing outward (e.g., away from the wheel 16 when assembled) and a substantially smooth face 42 facing inward (e.g., towards the wheel 16 when assembled). In this example, the toothed face 40 includes at least one tooth 44, such as for example a plurality of teeth 44 to engage the teeth 26 formed on the inner periphery of the cavity 22 when both the pawls 18 and the wheel 16 are assembled within the cavity 22. In the illustrated example, each pawl includes five teeth 44 formed on the pawl 18, and a sixth tooth 44a formed on one end 18a of the pawl 18. It will be appreciated by one of ordinary skill in the art that the number and/or shape of the teeth 44, 44a may vary as desired, and while each of the teeth 44 may be generally similar, if not identical, in shape, the shape and/or position of the teeth 44 may vary to provide different effects, such as for instance, various clocking modes as appropriate.

In this example, as best illustrated in FIG. 10, the five teeth 44 are generally uniform in appearance and include a substantially triangular tooth profile. The sixth tooth 44a meanwhile includes a slightly more rounded tooth profile, which as will be described in detail herein, may better assist in allowing the pawl 18 to move relative to the inner periphery of the cavity 22 when the wheel 16 is rotated in the correct direction. In addition, to further assist the pawl 18 in movement relative to the inner periphery of the cavity 22, the smooth face 42 near the end 18a of the pawl 18 may include a cammed surface 50 for engagement with the corresponding inclined face 37 of the pawl recess 32. An opposite end 18b includes a generally flat surface. It will be understood, however, that the number, arrangement, and/or shape of any of the teeth 44 as well as the overall shape of the faces of the pawl 18 may vary as desired.

Figure 5:
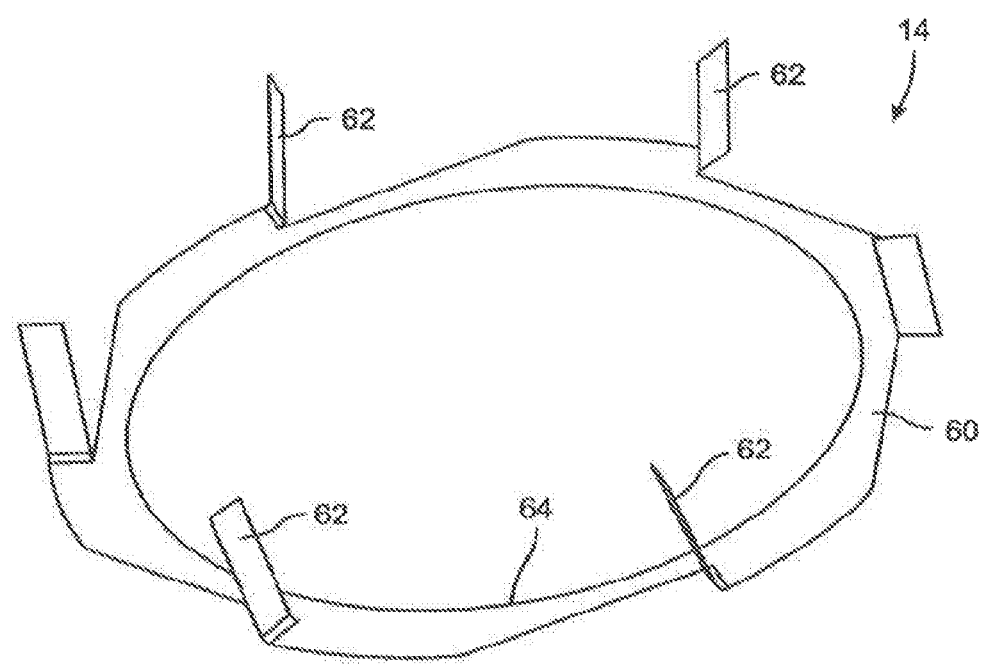
FIG. 5 is a perspective view of an example spring ring for use in the example ratchet of FIG. 1.

As best illustrated in FIG. 5, the example spring ring 14 includes a generally planar surface 60, and at least one resilient biasing leaf 62 extending from the planar surface 60. In this example, the spring ring 14 includes six leafs 62 corresponding to the number of pawl recesses 32 and pawls 18. The planar surface 60 of the spring ring 14 is sized to be mounted inside the cavity 22 and abut one of the flange 24 or the cap 20. The spring ring 14 further defines an aperture 64 substantially corresponding to the size of the aperture 21.

When assembled, the leaf 62 of the spring ring 14 longitudinally extends into the corresponding pawl recess 32 between the upright face 39 of the pawl recess 32 and the flat surface of the end 18b of the pawl 18. In this manner the spring ring 14 biases the pawl 18 away from the upright face 39 of the pawl recess, and towards the teeth 26 along the inner periphery of the cavity 22, thereby engaging the teeth 44 on the pawl 18 with the teeth 26 in the cavity 22.

Figure 6:
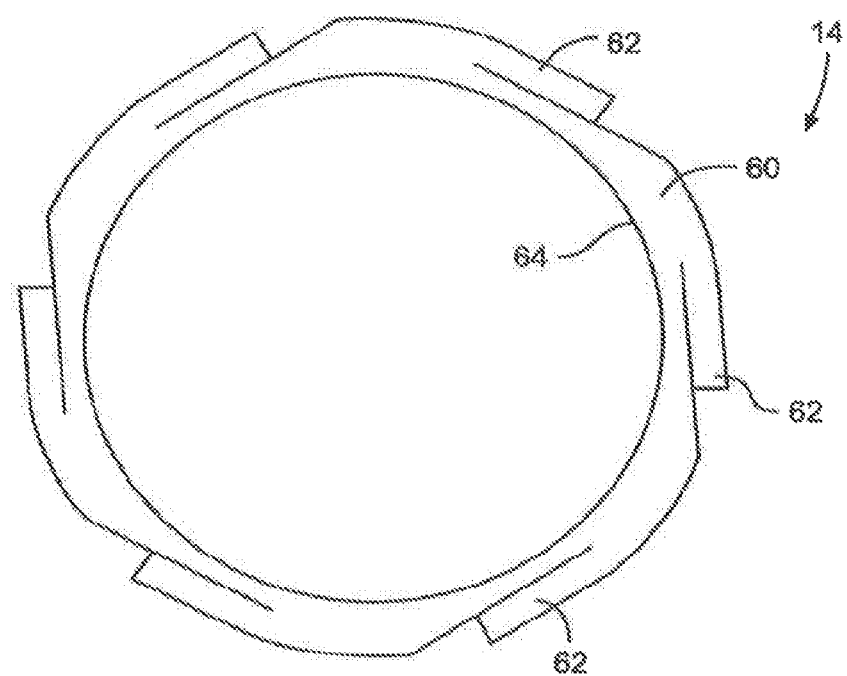
FIG. 6 is a top plan view of the example spring ring of FIG. 5, prior to formation of a plurality of spring leafs.

As illustrated in FIG. 6, in one example the spring ring 14 is manufactured from a single piece of resilient material through any suitable manufacturing technique, including for instance, stamping, etc. As shown, the leafs 62 may be cut and/or otherwise separated from the planar surface 60 and resiliently bent away from the surface 60 to form the resilient biasing leaf 62. The relative ease of manufacturing and the relative ease of assembling the components of the ratchet 10 will therefore be appreciated.

Figure 4:
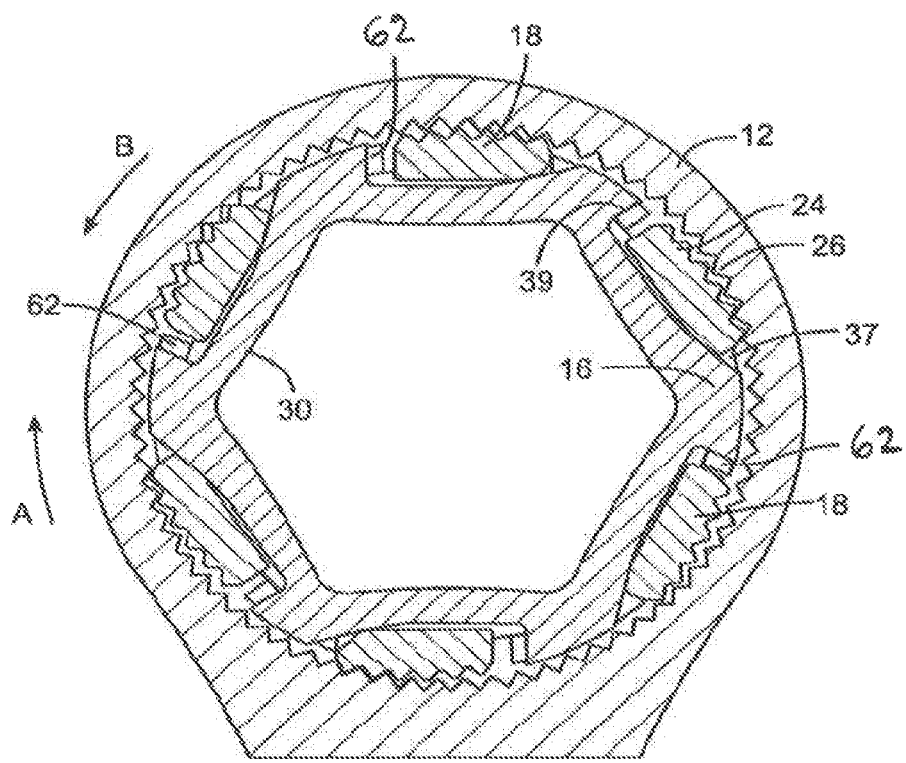
FIG. 4 is cross sectional top plan view of the assembled example ratchet taken along line C-C of FIG. 3.

With reference to the cross sectional illustration of FIG. 4, in operation, the assembled ratchet wrench 10, and more particularly the socket 30 is placed over a nut or other suitable element and is engaged inside the socket 30. In the orientation illustrated in FIG. 4, the handle 12 is rotated in the direction of the arrow A (e.g., clockwise) to make the teeth 44 of the pawl 18 engage the teeth 26 of the cavity 22. Specifically, upon rotation of the handle 12 in the direction of the arrow A, the pawl 18, under a biasing force created by the leaf 62 is forced towards the teeth 26 and as rotation continues, is thus urged by the engagement of the teeth 26 and the pawl teeth 44 against the bias towards the upright face 39 of the wheel 16. The wheel 16 is therefore pushed by and rotates with handle thereby rotating the nut or other element engaged inside the socket 30.

Still referring to FIG. 4, when the handle is rotated in the direction of the arrow B (e.g., counter-clockwise), the teeth 44 of the pawl 18 move along the teeth 26, sliding over the teeth 26 (i.e., ratcheting). In this instance, the wheel 16 does not rotate with the handle 12, and the ratchet wrench 10 does not rotate the nut or other element engaged inside the socket. To reverse the direction of the arrows A and B, the wrench 10 need only be turned over.

As can be seen in the example of FIG. 4, the six pawls 18 are divided into three sets each of the sets having two pawls 18 respectively. The sample pawl sets are each clocked differently by the wheel 16 such that when one set of pawls is engaged with the teeth 26, one of the other sets of pawls is only partially engaged (e.g., half engaged) and the remaining set of pawls is disengaged.

Figure 11:
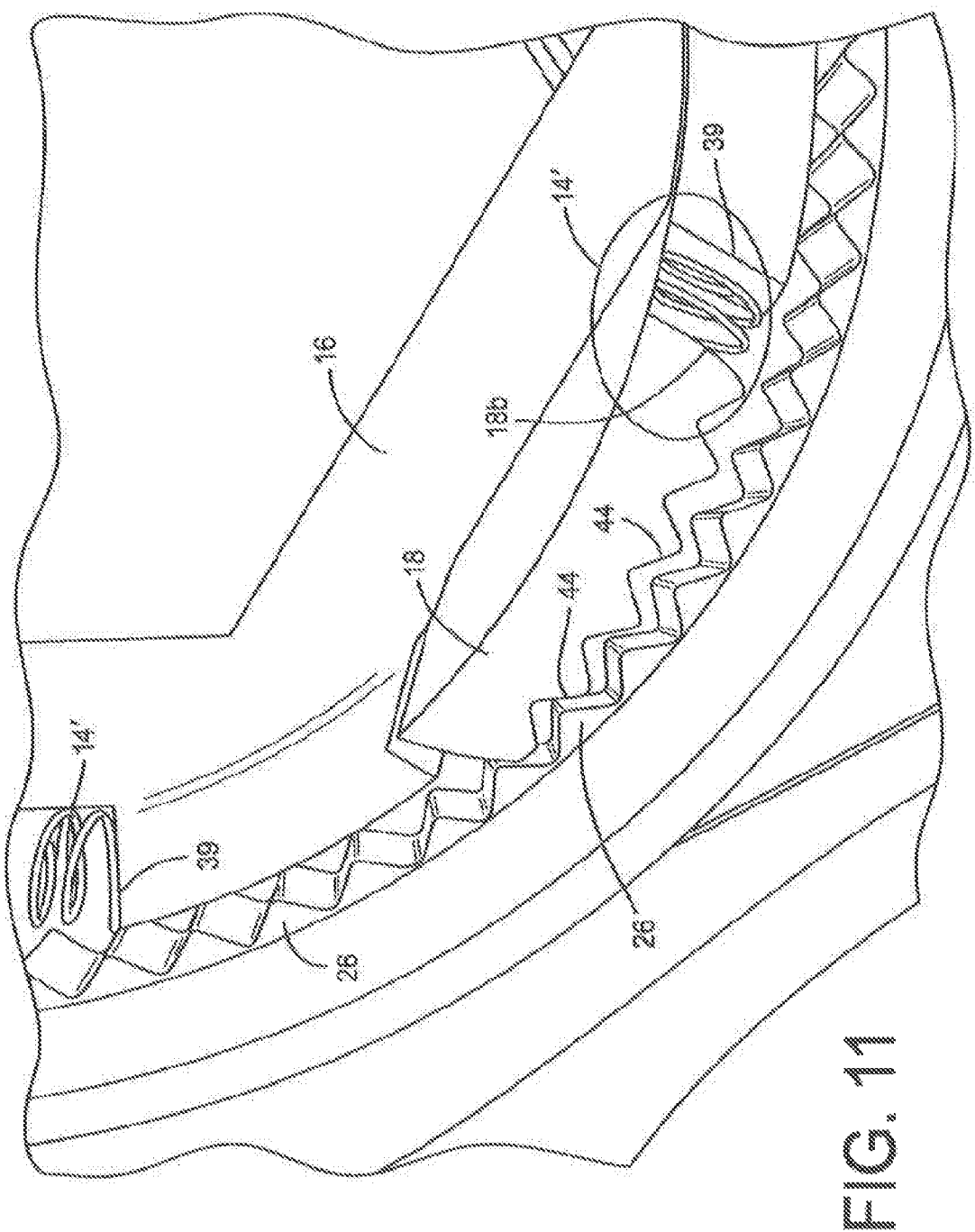
FIG. 11 is an enlarged top plan view of an example spring for use with the example ratchet of FIG. 1.

Referring now to FIG. 11, there is illustrated another example spring 14' for use in the example wrench 10. The spring 14' may be used as an alternative to the spring ring 14 or may be used in addition to the spring ring 14 as desired. In this example, the spring 14' includes a coil spring located within at least one of the pawl recesses and between the upright face 39 of the wheel 16 and the corresponding flat surface of the end 18b of the pawl 18. In this manner the spring 14' similarly biases the pawl 18 away from the upright face 39 of the pawl recess, and towards the teeth 26 along the inner periphery of the cavity 22, thereby engaging the teeth 44 on the pawl 18 with the teeth 26 in the cavity 22. As will be appreciated by one of ordinary skill in the art the spring 14' and/or the spring ring 14 as disclosed herein may be any suitable spring for locating between the pawl and the upright face of the inner wheel and/or for biasing the pawl 18 into contact with the teeth 26 of the cavity 22. For example, in alternative and/or in addition to the springs already disclosed, the bias may be provided by any resilient element included a resilient material, a torsion spring, a tension spring, a flat spring, leaf spring, helical spring, volute spring, or any other suitable biasing member.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. A ratchet assembly comprising:
   a housing defining a cavity and a plurality of teeth formed circumferentially on an inner periphery of the cavity;
   a wheel rotatably mounted in the cavity of the housing and comprising:
   a socket adapted to engage a nut or other suitable element; and
   a pawl recess defined around an outer periphery of the wheel, the pawl recess being bordered by an inclined face on one side and a generally upright face on the other, both extending from the outer periphery of the wheel;
   a pawl received in the pawl recess, the pawl having at least one tooth wherein the at least one tooth is provided facing outward from the outer periphery of the wheel to selectively engage with a corresponding one or more of the plurality of teeth formed on the inner periphery of the cavity; and
   a spring member mounted in the cavity of the housing and comprising a resilient biasing element extending into and positioned within the pawl recess between the upright face of the pawl recess and a surface of the pawl that generally faces towards the upright face of the pawl recess,
   wherein the resilient biasing element spring member, without requiring movement of the wheel, provides a biasing force against the surface of the pawl in a direction that is away from the upright face of the pawl recess and substantially towards the inclined face of the pawl recess to urge the pawl into the inclined face of the pawl recess and, thereby, into contact with the inner periphery of the cavity.

2. The ratchet assembly as recited in claim 1, wherein the cavity is circular.

3. The ratchet assembly as recited in claim 1, wherein the cavity comprises an integrally formed flange to at least partially enclose one side of the cavity.

4. The ratchet assembly as recited in claim 1, wherein the cavity is configured to receive a removable cap to at least partially enclose one side of the cavity.

5. The ratchet assembly as recited in claim 4, wherein the cavity is threaded to receive corresponding threads formed on the removable cap.

6. The ratchet assembly as recited in claim 1, wherein the resilient biasing element is a spring ring member comprising a leaf spring.

7. The ratchet assembly as recited in claim 6, wherein the spring ring member comprises a generally planar surface and wherein the leaf spring comprises a resilient element attached at one end to the spring ring member and extends from the generally planar surface.

8. The ratchet assembly as recited in claim 7, wherein the cavity comprises an integrally formed flange to at least partially enclose one side of the cavity and the generally planar surface of the spring ring member is disposed intermediate the flange and the wheel.

9. The ratchet assembly as recited in claim 8, wherein the cavity is configured to receive a removable cap to at least partially enclose one side of the cavity.

10. The ratchet assembly as recited in claim 1, wherein the spring member is a coil spring.

11. The ratchet assembly as recited in claim 1, wherein the pawl includes a cammed surface for abutting the inclined face defining the pawl recess.

12. A ratchet wrench comprising:
    a handle having an end defining a cavity and a plurality of teeth formed circumferentially on at least a portion of an inner periphery of the cavity;
    a wheel rotatably mounted in the cavity of the handle and comprising:
    a receiving socket defined within the wheel; and
    a pawl recess defined around an outer periphery of the wheel, the pawl recess being bordered by an inclined face on one side and a generally upright face on the other, both extending from the outer periphery of the wheel;
    a pawl received in the pawl recess, the pawl having at least one tooth facing outward from the outer periphery of the wheel to selectively engage with a corresponding one or more of the plurality of teeth formed on the inner periphery of the cavity; and
    a biasing member mounted in the cavity of the handle, the biasing member comprising:
    a resilient biasing element extending from a spring ring into the pawl recess between the upright face of the pawl recess and a surface of the pawl that generally faces towards the upright face of the pawl recess,
    wherein the resilient biasing element provides a biasing force against the surface of the pawl in a direction that is away from the upright face of the pawl recess and substantially towards the inclined face of the pawl recess to urge the pawl into the inclined face of the pawl recess and, thereby, into contact with the inner periphery of the cavity, and
    wherein the cavity comprises an integrally formed flange to at least partially enclose one side of the cavity and the spring ring is disposed intermediate the flange and the wheel.

13. The ratchet wrench of claim 12, wherein the cavity is configured to receive a removable cap to at least partially enclose one side of the cavity.

14. The ratchet wrench of claim 13, wherein the cavity is threaded to receive corresponding threads formed on the removable cap.

15. The ratchet wrench of claim 12, wherein the spring ring comprises a generally planar surface and the resilient biasing element is a leaf spring extending from the generally planar surface.

16. The ratchet wrench of claim 12, wherein the pawl includes a cammed surface for abutting the inclined face defining the pawl recess.

* * * * *